US008335683B2

(12) United States Patent
Acero et al.

(10) Patent No.: US 8,335,683 B2
(45) Date of Patent: Dec. 18, 2012

(54) SYSTEM FOR USING STATISTICAL CLASSIFIERS FOR SPOKEN LANGUAGE UNDERSTANDING

(75) Inventors: Alejandro Acero, Bellevue, WA (US); Ciprian Chelba, Palo Alto, CA (US); Ye-Yi Wang, Redmond, WA (US); Leon Wong, Redmond, WA (US); Brendan Frey, Mississauga (CA)

(73) Assignee: Microsoft Corporation, Redmond, WA (US)

( * ) Notice: Subject to any disclaimer, the term of this patent is extended or adjusted under 35 U.S.C. 154(b) by 1356 days.

(21) Appl. No.: 10/350,199

(22) Filed: Jan. 23, 2003

(65) Prior Publication Data

US 2004/0148154 A1 Jul. 29, 2004

(51) Int. Cl.
*G06F 17/27* (2006.01)

(52) U.S. Cl. ............. 704/9; 704/246; 704/255; 704/275

(58) Field of Classification Search ............... 704/9, 246, 704/255, 275; 707/1–6
See application file for complete search history.

(56) References Cited

U.S. PATENT DOCUMENTS

| | | | | |
|---|---|---|---|---|
| 5,675,710 A * | 10/1997 | Lewis | ............................ | 706/12 |
| 5,687,364 A * | 11/1997 | Saund et al. | ........................ | 704/5 |
| 5,712,953 A * | 1/1998 | Langs | ............................ | 704/214 |
| 5,835,893 A * | 11/1998 | Ushioda | ............................ | 704/9 |
| 5,860,063 A * | 1/1999 | Gorin et al. | ..................... | 704/257 |
| 6,067,517 A * | 5/2000 | Bahl et al. | .................. | 704/256.4 |
| 6,067,520 A * | 5/2000 | Lee | ............................... | 704/270 |
| 6,161,130 A * | 12/2000 | Horvitz et al. | ................ | 709/206 |
| 6,192,360 B1 * | 2/2001 | Dumais et al. | .................... | 707/6 |
| 6,212,532 B1 * | 4/2001 | Johnson et al. | ............... | 715/500 |
| 6,253,169 B1 * | 6/2001 | Apte et al. | ........................ | 704/9 |
| 6,269,364 B1 | 7/2001 | Kennedy et al. | .................... | 707/5 |
| 6,456,991 B1 * | 9/2002 | Srinivasa et al. | ................ | 706/20 |
| 6,510,411 B1 * | 1/2003 | Norton et al. | ................. | 704/254 |
| 6,587,822 B2 * | 7/2003 | Brown et al. | ................... | 704/275 |
| 6,606,620 B1 * | 8/2003 | Sundaresan et al. | ............. | 707/3 |
| 6,643,620 B1 * | 11/2003 | Contolini et al. | ............ | 704/270 |
| 6,675,159 B1 * | 1/2004 | Lin et al. | ........................... | 707/3 |
| 6,687,705 B2 * | 2/2004 | Agrawal et al. | ............... | 707/101 |
| 6,735,560 B1 * | 5/2004 | Epstein | ............................. | 704/9 |
| 6,766,287 B1 * | 7/2004 | Kupiec et al. | ..................... | 704/9 |
| 6,842,751 B1 * | 1/2005 | Vilalta et al. | .......................... | 1/1 |
| 6,865,528 B1 * | 3/2005 | Huang et al. | ...................... | 704/9 |
| 6,895,083 B1 * | 5/2005 | Bers et al. | .................. | 379/88.01 |
| 6,938,025 B1 * | 8/2005 | Lulich et al. | ..................... | 706/45 |
| 6,963,831 B1 * | 11/2005 | Epstein | ............................. | 704/9 |
| 7,003,327 B1 * | 2/2006 | Payne et al. | ................... | 455/566 |
| 7,003,459 B1 * | 2/2006 | Gorin et al. | .................. | 704/240 |
| 7,031,530 B2 * | 4/2006 | Driggs et al. | ................. | 382/228 |
| 7,039,856 B2 * | 5/2006 | Peairs et al. | .................. | 715/500 |

(Continued)

OTHER PUBLICATIONS

Wang et al., Combination of statistical and rule-based approaces for spoken language understanding, 2002, Proc. ICSLP, p. 609-612.*

(Continued)

*Primary Examiner* — David R Hudspeth
*Assistant Examiner* — Lamont Spooner
(74) *Attorney, Agent, or Firm* — Joseph R. Kelly; Westman, Champlin & Kelly, P.A.

(57) ABSTRACT

The present invention involves using one or more statistical classifiers in order to perform task classification on natural language inputs. In another embodiment, the statistical classifiers can be used in conjunction with a rule-based classifier to perform task classification.

22 Claims, 7 Drawing Sheets

U.S. PATENT DOCUMENTS

| | | | |
|---|---|---|---|
| 7,046,789 B1* | 5/2006 | Anderson et al. | 379/265.01 |
| 7,092,888 B1* | 8/2006 | McCarthy et al. | 704/277 |
| 7,096,179 B2* | 8/2006 | Zhu et al. | 704/1 |
| 7,107,254 B1* | 9/2006 | Dumais et al. | 706/50 |
| 7,130,837 B2* | 10/2006 | Tsochantaridis et al. | 706/55 |
| 7,149,695 B1* | 12/2006 | Bellegarda | 704/275 |
| 7,158,935 B1* | 1/2007 | Gorin et al. | 704/257 |
| 7,177,814 B2* | 2/2007 | Gong et al. | 704/270.1 |
| 7,216,073 B2* | 5/2007 | Lavi et al. | 704/9 |
| 7,275,033 B1* | 9/2007 | Zhao et al. | 704/255 |
| 7,346,490 B2* | 3/2008 | Fass et al. | 704/7 |
| 7,546,382 B2* | 6/2009 | Healey et al. | 709/246 |
| 7,590,538 B2* | 9/2009 | St. John | 704/246 |
| 2002/0022956 A1* | 2/2002 | Ukrainczyk et al. | 704/9 |
| 2002/0183984 A1* | 12/2002 | Deng et al. | 703/1 |
| 2002/0196679 A1 | 12/2002 | Lavi et al. | 365/200 |
| 2003/0046421 A1* | 3/2003 | Horvitz et al. | 709/238 |
| 2003/0065502 A1* | 4/2003 | Zhu et al. | 704/4 |
| 2003/0105638 A1* | 6/2003 | Taira | 704/275 |
| 2003/0182131 A1* | 9/2003 | Arnold et al. | 704/275 |
| 2003/0187642 A1* | 10/2003 | Ponceleon et al. | 704/252 |
| 2003/0225825 A1* | 12/2003 | Healey et al. | 709/203 |
| 2003/0233350 A1* | 12/2003 | Dedhia et al. | 707/3 |
| 2004/0042651 A1* | 3/2004 | Ii et al. | 382/159 |
| 2004/0042652 A1* | 3/2004 | Ii et al. | 382/160 |
| 2004/0042666 A1* | 3/2004 | Ii et al. | 382/228 |
| 2004/0059697 A1* | 3/2004 | Forman | 706/46 |
| 2004/0085162 A1* | 5/2004 | Agarwal et al. | 333/196 |
| 2004/0148170 A1* | 7/2004 | Acero et al. | 704/257 |
| 2005/0108200 A1* | 5/2005 | Meik et al. | 707/3 |

OTHER PUBLICATIONS

Scott et al., Feature Engineering for Text Classification, 1999, Proc ICML-99, not numbered, numbered herein, p. 1-12.*

Dumais, S., "Using SVMs for Text Catorization" in IEEE Intelligent Systems Magazine. Trends and Controversies, 1998. 13(4).

Burger, C.J.C., "A tutorial on support vector machines for pattern recognition" in Data Mining and Knowledge Discovery, 1998.2(2): p. 121-167.

Platt, J.C., "Fast Training of Support Vector Machines Using Sequential Minimal Optimization" in Advances in Kernel Methods-Support Vector Learning. 1999 p. 185-208.

Office action for U.S. Appl. No. 10/449,708, filed May 30, 2003, office action mailed Sep. 7, 2007.

Acero, Office action for U.S. Appl. No. 10/449,708, filed May 30, 2003, mailed Jan. 30, 2009.

Acero, Office action for U.S. Appl. No. 10/449,708, filed May 30, 2003, mailed Jun. 27, 2008.

Acero, Office action for U.S. Appl. No. 10/449,708, filed May 30, 2003, mailed Sep. 7, 2007.

Wang, Y.-Y., et al. *Combination of Statistical and Rule-Based Approaches for Spoken Language Understanding.* ICSLP. 2002. Denver, Colorado.

Feature Engineering for Text Classification (1999), Sam Scott, Stan Matwin Proceedings of ICML-99, 16th International Conference on Machine Learning.

* cited by examiner

SYSTEM FOR USING STATISTICAL CLASSIFIERS FOR SPOKEN LANGUAGE UNDERSTANDING

BACKGROUND OF THE INVENTION

The present invention deals with spoken language understanding. More specifically, the present invention deals with the use of statistical classification for spoken language understanding.

Natural language understanding is the process of receiving at a computer an input expressed as a natural language input. The computer then attempts to understand the meaning of the natural language input and take any desired action based on the natural language input.

Two types of natural language inputs which interfaces have attempted to accommodate in the past include type-in lines and speech inputs. Type-in lines simply include a field into which the user can type a natural language expression. Speech inputs include a speech recognition engine which receives a speech signal input by the user and generates a textual representation of the speech signal.

SUMMARY OF THE INVENTION

Natural user interfaces which can accept natural language inputs must often gain two levels of understanding of the input in order to complete an action (or task) based on the input. First, the system must classify the user input to one of a number of different classes or tasks. This involves first generating a list of tasks which the user can request and then classifying the user input to one of those different tasks.

Next, the system must identify semantic items in the natural language input. The semantic items correspond to the specifics of a desired task.

By way of example, if the user typed in a statement "Send an email to John Doe." Task classification would involve identifying the task associated with this input as a "Send-Mail" task and the semantic analysis would involve identifying the term "John Doe" as the "recipient" of the electronic mail message to be generated.

Statistical classifiers are generally considered to be robust and can be easily trained. Also, such classifiers require little supervision during training, but they often suffer from poor generalization when data is insufficient. Grammar-based robust parsers are expressive and portable, and can model the language in granularity. These parsers are easy to modify by hand in order to adapt to new language usages. While robust parsers yield an accurate and detailed analysis when a spoken utterance is covered by the grammar, they are less robust for those sentences not covered by the training data, even with robust understanding techniques.

One embodiment of the present invention involves using one or more statistical classifiers in order to perform task classification on natural language inputs. In another embodiment, the statistical classifiers can be used in conjunction with a rule-based classifier to perform task classification.

While an improvement in task classification itself is helpful and addresses the first level of understanding that a natural language interface must demonstrate, task classification alone may not provide the detailed understanding of the semantics required to complete some tasks based on a natural language input. Therefore, another embodiment of the present invention includes a semantic analysis component as well. This embodiment of the invention uses a rule-based understanding system to obtain a deep understanding of the natural language input. Thus, the invention can include a two pass approach in which classifiers are used to classify the natural language input into one or more tasks and then rule-based parsers are used to fill semantic slots in the identified tasks.

DETAILED DESCRIPTION OF ILLUSTRATIVE EMBODIMENTS

Overview

Two different aspects of the present invention involve performing task classification on a natural language input and performing semantic analysis on a natural language input in conjunction with task classification in order to obtain a natural user interface. However, prior to discussing the invention in more detail, one embodiment of an exemplary environment in which the present invention can be implemented will be discussed.

Figure 1:
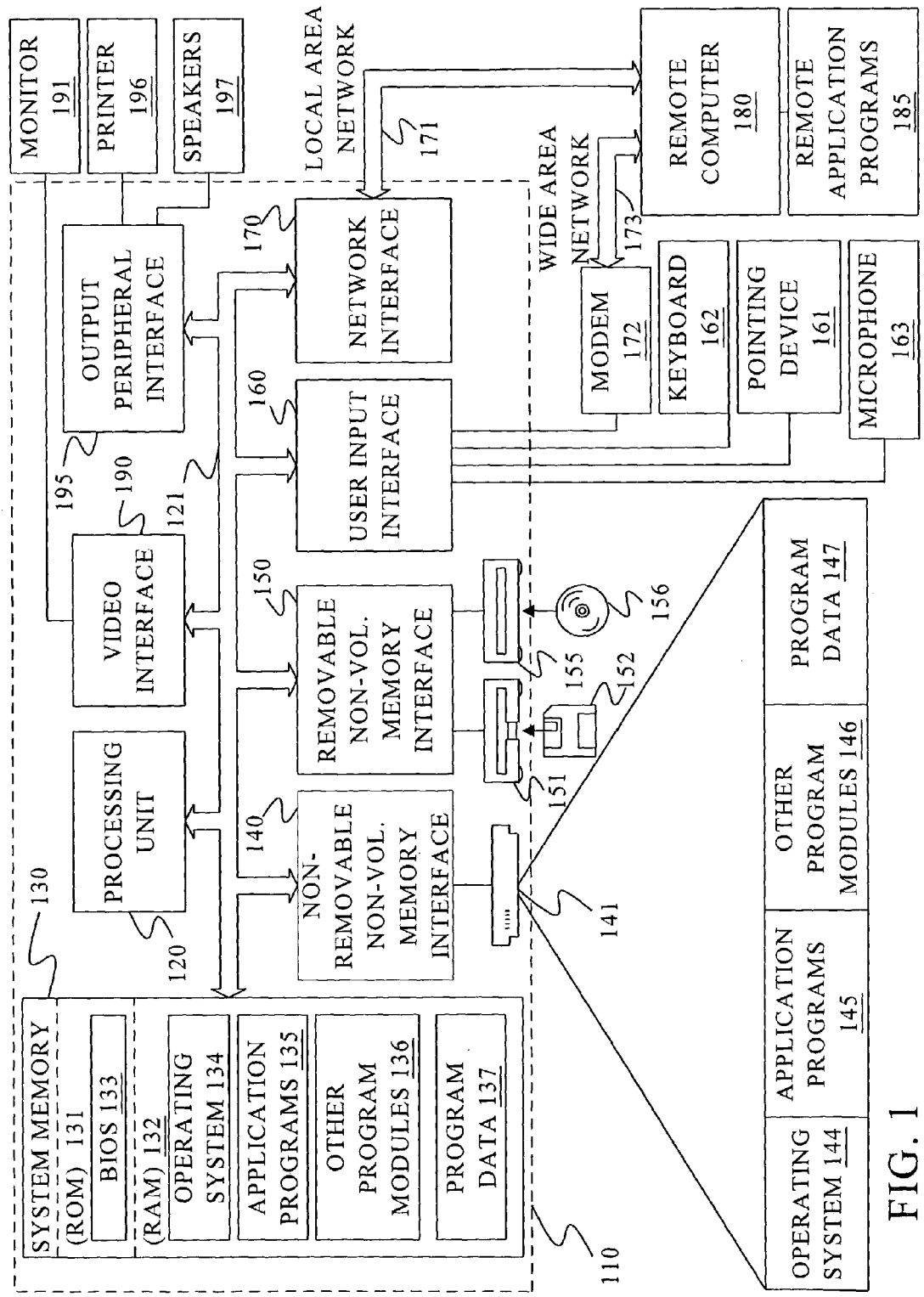
FIG. 1 is a block diagram of one illustrative environment in which the present invention can be used.

FIG. 1 illustrates an example of a suitable computing system environment in which the invention may be implemented. The computing system environment is only one example of a suitable computing environment and is not intended to suggest any limitation as to the scope of use or functionality of the invention. Neither should the computing environment be interpreted as having any dependency or requirement relating to any one or combination of components illustrated in the exemplary operating environment.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 100. Communication media typically embodies computer readable instructions, data structures, program modules or other data in a modulated data signal such as a carrier WAV or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, FR, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during startup, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, Intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user-input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

It should be noted that the present invention can be carried out on a computer system such as that described with respect to FIG. 1. However, the present invention can be carried out on a server, a computer devoted to message handling, or on a distributed system in which different portions of the present invention are carried out on different parts of the distributed computing system.

Overview of Task Classification System

Figure 2:
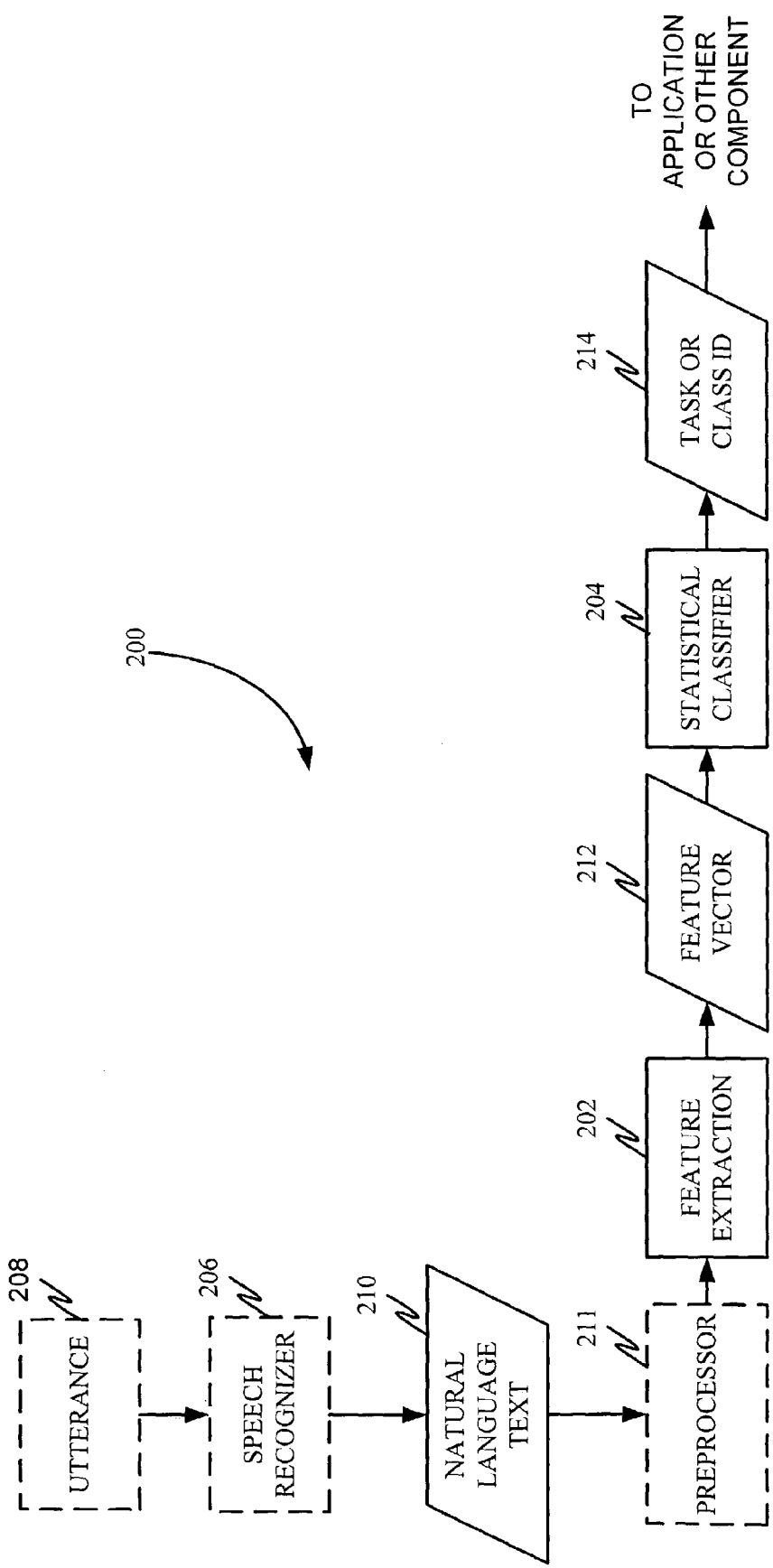
FIG. 2 is a block diagram of a portion of a natural language interface in accordance with one embodiment of the present invention.

FIG. 2 is a block diagram of a portion of a natural language interface 200. System 200 includes a feature selection component 202 and a statistical classifier 204. System 200 can also include optional speech recognition engine 206 and optional preprocessor 211. Where interface 200 is to accept speech signals as an input, it includes speech recognizer 206. However, where interface 200 is simply to receive textual input, speech recognizer 206 is not needed. Also, preprocessing (as discussed below) is optional. The present discussion will proceed with respect to an embodiment in which speech recognizer 206 and preprocessor 211 are present, although it will be appreciated that they need not be present in other embodiments. Also, other natural language communication modes can be used, such as handwriting or other modes. In such cases, suitable recognition components, such as handwriting recognition components, are used.

In order to perform task classification, system 200 first receives an utterance 208 in the form of a speech signal that represents natural language speech spoken by a user. Speech recognizer 206 performs speech recognition on utterance 208 and provides, at its output, natural language text 210. Text 210 is a textual representation of the natural language utterance 208 received by speech recognizer 206. Speech recognizer 206 can be any known speech recognition system which performs speech recognition on a speech input. Speech recognizer 206 may include an application-specific dictation language model, but the particular way in which speech recognizer 206 recognizes speech does not form any part of the invention. Similarly, in another embodiment, speech recognizer 206 outputs a list of results or interpretations with respective probabilities. Later components operate on each interpretation and use the associated probabilities in task classification.

Natural language text 210 can optionally be provided to preprocessor 211 for preprocessing and then to feature selection component 202. Preprocessing is discussed below with respect to feature selection. Feature selection component 202 identifies features in natural language text 210 (or in each text 210 in the list of results output by the speech recognizer) and outputs feature vector 212 based upon the features identified in text 210. Feature selection component 202 is discussed in greater detail below. Briefly, feature selection component 202 identifies features in text 210 that can be used by statistical classifier 204.

Statistical classifier 204 receives feature vector 212 and classifies the feature vector into one or more of a plurality of predefined classes or tasks. Statistical classifier 202 outputs a task or class identifier 214 identifying the particular task or class to which statistical classifier 204 has assigned feature vector 212. This, of course, also corresponds to the particular class or task to which the natural language input (utterance 208 or natural language text 210) corresponds. Statistical classifier 204 can alternatively output a ranked list (or n-best list) of task or class identifiers 214. Statistical classifier 204 will also be described in greater detail below. The task identifier 214 is provided to an application or other component that can take action based on the identified task. For example, if the identified task is to SendMail, identifier 214 is sent to the electronic mail application which can, in turn, display an electronic mail template for use by the user. Of course, any other task or class is contemplated as well. Similarly, if an n-best list of identifiers 214 is output, each item in the list can be displayed through a suitable user interface such that a user can select the desired class or task.

It can thus be seen that system 200 can perform at least the first level of understanding required by a natural language interface—that is, identifying a task represented by the natural language input.

Feature Selection

A set of features must be selected for extraction from the natural language input. The set of features will illustratively be those found to be most helpful in performing task classification. This can be empirically, or otherwise, determined.

In one embodiment, the natural language input text 210 is embodied as a set of words. One group of features will illustratively correspond to the presence or absence of words in the natural language input text 210, wherein only words in a certain vocabulary designed for a specific application are considered, and words outside the vocabulary are mapped to a distinguished word-type such as <UNKNOWN>. Therefore, for example, a place will exist in feature vector 212 for each word in the vocabulary (including the <UNKNOWN> word), and its place will be filled with a value of 1 or 0 depending upon whether the word is present or not in the natural language input text 210, respectively. Thus, the binary feature vector would be a vector having a length corresponding to the number of words in the lexicon (or vocabulary) supported by the natural language interface.

Of course, it should be noted that many other features can be selected as well. For example, the co-occurrences of words can be features. This may be used, for instance, in order to more explicitly identify tasks to be performed. For example, the co-occurrence of the words "send mail" may be a feature in the feature vector. If these two words are found, in this order, in the input text, then the corresponding feature in the feature vector is marked to indicate the feature was present in the input text. A wide variety of other features can be selected as well, such as bi-grams, tri-grams, other n-grams, and any other desired features.

Similarly, preprocessing can optionally be performed on natural language text 210 by preprocessor 211 in order to arrive at feature vector 212. For instance, it may be desirable that the feature vector 212 only indicate the presence or absence of words that have been predetermined to carry semantic content. Therefore, natural language text 210 can be preprocessed to remove stop words and to maintain only content words, prior to the feature selection process. Similarly, preprocessor 211 can include rule-based systems (discussed below) that can be used to tag certain semantic items in natural language text 210. For instance, the natural language text 210 can be preprocessed so that proper names are tagged as well as the names of cities, dates, etc. The existence of these tags can be indicated as a feature as well. Therefore, they will be reflected in feature vector 212. In another embodiment, the tagged words can be removed and replaced by the tags.

In addition stemming can also be used in feature selection. Stemming is a process of removing morphological variations in words to obtain their root forms. Examples of morphological variations include inflectional changes (such as pluralization, verb tense, etc.) and derivational changes that alter a word's grammatical role (such as adjective versus adverb as in slow versus slowly, etc.) Stemming can be used to condense multiple features with the same underlying semantics into single features. This can help overcome data sparseness, improve computational efficiency, and reduce the impact of the feature independence assumptions used in statistical classification methods.

In any case, feature vector 212 is illustratively a vector which has a size corresponding to the number of features selected. The state of those features in natural language input text 210 can then be identified by the bit locations corresponding to each feature in feature vector 212. While a number of features have been discussed, this should not be intended to limit the scope of the present invention and different or other features can be used as well.

Task or Class Identification (Text Classification)

Statistical classifiers are very robust with respect to unseen data. In addition, they require little supervision in training. Therefore one embodiment of the present invention uses statistical classifier 204 to perform task or class identification on the feature vector 212 that corresponds to the natural language input. A wide variety of statistical classifiers can be used as classifier 204, and different combinations can be used as well. The present discussion proceeds with respect to Naive Bayes classifiers, task-dependent n-gram language models, and support vector machines. The present discussion also proceeds with respect to a combination of statistical classifiers, and a combination of statistical classifiers and a rule-based system for task or class identification.

The following description will proceed assuming that the feature vector is represented by w and it has a size V (which is the size of the vocabulary supported by system 200) with binary elements (or features) equal to one if the given word is present in the natural language input and zero otherwise. Of course, where the features include not only the vocabulary or lexicon but also other features (such as those mentioned above with respect to feature selection) the dimension of the feature vector will be different.

The Naive Bayes classifier receives this input vector and assumes independence among the features. Therefore, given input vector w, its target class can be found by choosing the class with the highest posterior probability:

$$\hat{c} = \arg\max_c P(c \mid w) = \arg\max_c P(c)P(w \mid c) \quad \text{Eq. 1}$$

$$= \arg\max_c P(c) \prod_{i=1}^{V} P(w_i = 1 \mid c)^{\delta(wi,1)} P(w_i = 0 \mid c)^{\delta(wi,0)}$$

Where P (c|w) is the probability of a class given the sentence (represented as the feature vector w);

P(c) is the probability of a class;

P(w|c) is the conditional probability of the feature vector extracted from a sentence given the class c;

P(wi=1|c) or P(wi=0|c) is the conditional probability that word wi is observed or not observed, respectively, in a sentence that belongs to class c;

δ(wi,1)=1, if wi=1 and 0 otherwise; and

δ(wi,0)=1, if wi=0 and 0 otherwise.

In other words, according to Equation 1, the classifier picks the class c that has the greatest probability P(c|w) as the target class for the natural language input. Where more than one target class is to be identified, then the top n probabilities calculated using P(c|w)=P(c)P(w|c) will correspond to the top n classes represented by the natural language input.

Because sparseness of data may be a problem, P(w$_i$|c) can be estimated as follows:

$$P(w_i = 1 \mid c) = \frac{N_c^i + b}{N_c + 2b} \quad \text{Eq. 2}$$

$$P(wi=0|c)=1-P(w_i=1|c) \quad \text{Eq. 3}$$

where $N_c$ is the number of natural language inputs for class c in the training data;

$N_c^i$ is the number of times word i appeared in the natural language inputs in the training data;

P(w$_i$=1|c) is the conditional probability that the word i appears in the natural language textual input given class c; and P(w$_i$=0|c) is the conditional probability that the word i does not appear in the input given class c; and b is estimated as a value to smooth all probabilities and is tuned to maximize the classification accuracy of cross-validation data in order to accommodate unseen data. Of course, it should be noted that b can be made sensitive to different classes as well, but may illustratively simply be maximized in view of cross-validation data and be the same regardless of class.

Also, it should again be noted that when using a Naïve Bayes classifier the feature vector can be different than simply all words in the vocabulary. Instead, preprocessing can be run on the natural language input to remove unwanted words, semantic items can be tagged, bi-grams, tri-grams and other word co-occurrences can be identified and used as features, etc.

Another type of classifier which can be used as classifier 204 is a set of class-dependent n-gram statistical language model classifiers. If the words in the natural language input 210 are viewed as values of a random variable instead of binary features, Equation 1 can be decomposed in a different way as follows:

$$\hat{c} = \arg\max_c P(c)P(w \mid c) \quad \text{Eq. 4}$$

$$= \arg\max_c P(c) \prod_{i=1}^{|w|} P(w_i \mid c, w_{i-1}, w_{i-2}, \cdots, w_1)$$

where |w| is the length of the text w, and Markov independence assumptions of orders 1, 2 and 3 can be made to use a task-specific uni-gram P(w$_i$|c), bi-gram P(w$_i$|c,w$_i$-1) or tri-gram P(w$_i$|c, w$_i$-1, w$_i$-2), respectively.

One class-specific model is generated for each class c. Therefore, when a natural language input 210 is received, the class-specific language models P(w|c) are run on the natural language input 210, for each class. The output from each language model is multiplied by the prior probability for the respective class. The class with the highest resulting value corresponds to the target class.

While this may appear to be highly similar to the Naive Bayes classifier discussed above, it is different. For example, when considering n-grams, word co-occurrences of a higher order are typically considered than when using the Naive Bayes classifier. For example, tri-grams require looking at word triplets whereas, in the Naive Bayes classifier, this is not necessarily the case.

Similarly, even if only uni-grams are used, in the n-gram classifier, it is still different than the Naive Bayes classifier. In the Naive Bayes Classifier, if a word in the vocabulary occurs in the natural language input 210, the feature value for that word is a 1, regardless of whether the word occurs in the input multiple times. By contrast, the number of occurrences of the word will be considered in the n-gram classifier.

In accordance with one embodiment, the class-specific n-gram language models are trained by splitting sentences in a training corpus among the various classes for which n-gram language models are being trained. All of the sentences corresponding to each class are used in training an n-gram classifier for that class. This yields a number c of n-gram language models, where c corresponds to the total number of classes to be considered.

Also, in one embodiment, smoothing is performed in training the n-gram language models in order to accommodate for unseen training data. The n-gram probabilities for the class-specific training models are estimated using linear interpolation of relative frequency estimates at different orders (such as 0 for a uniform model . . . , n for an n-gram model). The linear interpolation weights at different orders are bucketed according to context counts and their values are estimated using maximum likelihood techniques on cross-validation data. The n-gram counts from the cross-validation data are then added to the counts gathered from the main training data to enhance the quality of the relative frequency estimates. Such smoothing is set out in greater detail in Jelinek and Mercer, *Interpolated Estimation of Markov Source Parameters From Sparse Data*, Pattern Recognition in Practice, Gelsema and Kanal editors, North-Holland (1980).

Support vector machines can also be used as statistical classifier 204. Support vector machines learn discriminatively by finding a hyper-surface in the space of possible inputs of feature vectors. The hyper-surface attempts to split the positive examples from the negative examples. The split is chosen to have the largest distance from the hyper-surface to the nearest of the positive and negative examples. This tends to make the classification correct for test data that is near, but not identical to, the training data. In one embodiment, sequential minimal optimization is used as a fast method to train support vector machines.

Again, the feature vector can be any of the feature vectors described above, such as a bit vector of length equal to the vocabulary size where the corresponding bit in the vector is set to one if the word appears in the natural language input, and other bits are set to 0. Of course, the other features can be selected as well and preprocessing can be performed on the natural language input prior to feature vector extraction, as also discussed above. Also, the same techniques discussed above with respect to cross validation data can be used during training to accommodate for data sparseness.

The particular support vector machine techniques used are generally known and do not form part of the present invention. One exemplary support vector machine is described in Burger, C. J. C., *A Tutorial on Support Vector Machines for Pattern Recognition*, Data Mining and Discovery, 1998, 2(2) pp. 121-167. One technique for performing training of the support vector machines as discussed herein is set out in Platt, J. C., *Fast Training of Support Vector Machines Using Sequential Minimal Optimization*, Advances in Kernel Methods—Support Vector Learning, B. Scholkopf, C. J. C. Burger, and A. J. Smola, editors, 1999, pp. 185-208.

Figure 3:
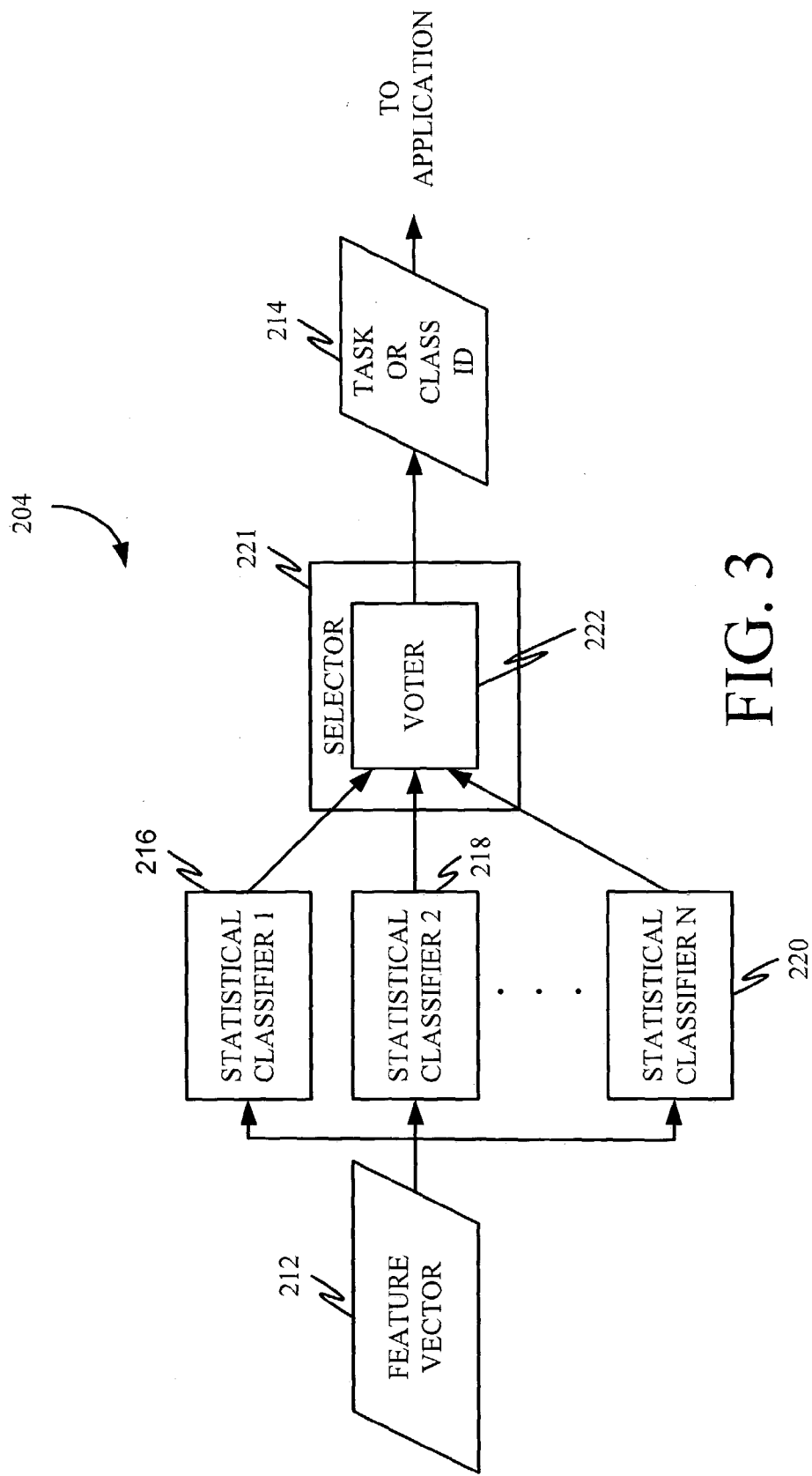
FIG. 3 illustrates another embodiment in which multiple statistical classifiers are used.

Another embodiment of statistical classifier 204 is shown in FIG. 3. In the embodiment shown in FIG. 3, statistical classifier component 204 includes a plurality of individual statistical classifiers 216, 218 and 220 and a selector 221 which is comprised of a voting component 222 in FIG. 3. The statistical classifiers 216-220 are different from one another and can be the different classifiers discussed above, or others. Each of these statistical classifiers 216-220 receives feature vector 212. Each classifier also picks a target class (or a group of target classes) which that classifier believes is represented by feature vector 212. Classifiers 216-220 provide their outputs to class selector 221. In the embodiment shown in FIG. 3, selector 221 is a voting component 222 which simply uses a known majority voting technique to output as the task or class ID 214, the ID associated with the task or class most often chosen by statistical classifiers 216-220 as the target class. Other voting techniques can be used as well. For example, when the classifiers 216-220 do not agree with one another, it may be sufficient to choose the output of a most accurate one of the classifiers being used, such as the support vector machine. In this way, the results from the different classifiers 216-220 can be combined for better classification accuracy.

In addition, each of classifiers 216-220 can output a ranked list of target classes (an n-best list). In that case, selector 221 can use the n-best list from each classifier in selecting a target class or its own n-best list of target classes.

Figure 4:
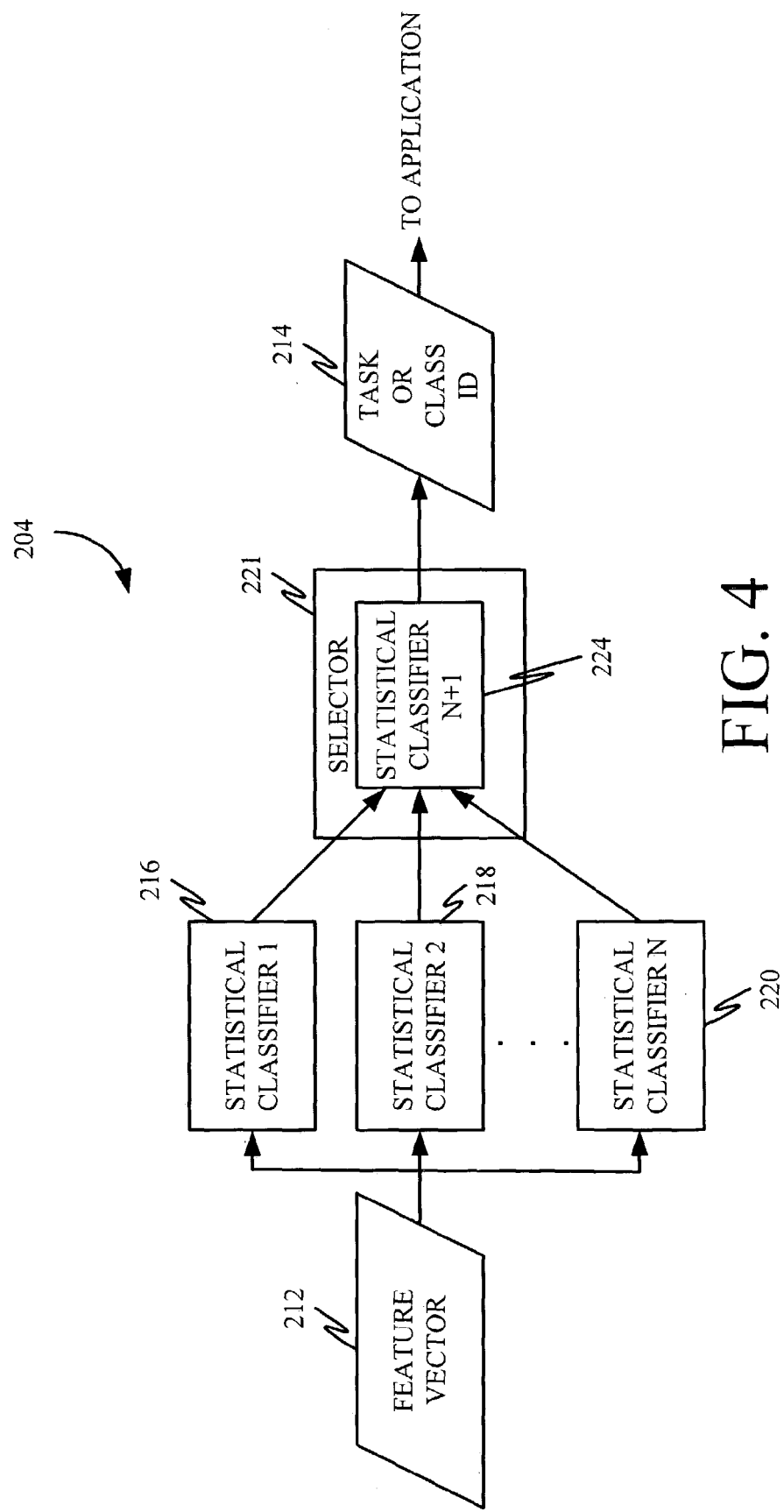
FIG. 4 illustrates another embodiment in which multiple, cascaded statistical classifiers are used.

FIG. 4 shows yet another embodiment of statistical classifier 204 shown in FIG. 2. In the embodiment shown in FIG. 4, a number of the items are similar to those shown in FIG. 3, and are similarly numbered. However, selector 221, which was a voting component 222 in the embodiment shown in FIG. 3, is an additional statistical classifier 224 in the embodiment shown in FIG. 4. Statistical classifier 224 is trained to take, as its input feature vector, the outputs from the other statistical classifiers 216-220. Based on this input feature vector, classifier 224 outputs the task or class ID 214. This further improves the accuracy of classification.

It should also be noted, of course, that the selector 221 which ultimately selects the task or class ID could be other components as well, such as a neural network or a component other than the voting component 222 shown in FIG. 3 and the statistical classifier 224 shown in FIG. 4.

In order to train the class or task selector 221 training data is processed. The selector takes as an input feature vector the outputs from the statistical classifiers 216-220 along with the correct class for the supervised training data. In this way, the selector 221 is trained to generate a correct task or class ID based on the input feature vector.

In another embodiment, each of the statistical classifiers 216-220 not only output a target class or a set of classes, but also a corresponding confidence measure or confidence score which indicates the confidence that the particular classifier has in its selected target class or classes. Selector 221 can receive the confidence measure both during training, and during run time, in order to improve the accuracy with which it identifies the task or class corresponding to feature vector 212.

Figure 5:
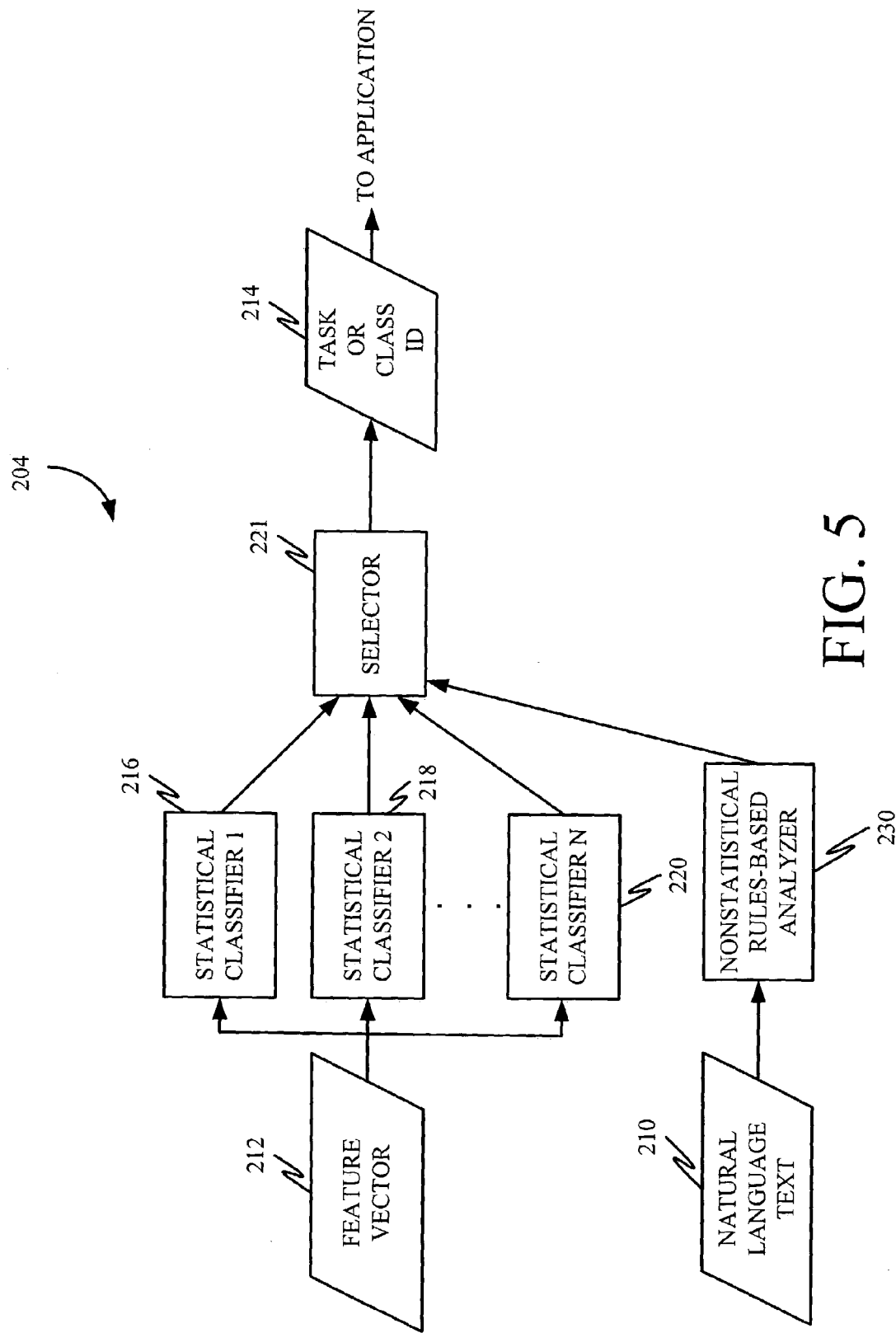
FIG. 5 is a block diagram illustrating another embodiment in which not only one or more statistical classifiers are used for task classification, and a rule-based analyzer is also used for task classification.

FIG. 5 illustrates yet another embodiment of classifier 204. A number of the items shown in FIG. 5 are similar to those shown in FIGS. 3 and 4, and are similarly numbered. However, FIG. 5 shows that classifier 204 can include non-statistical components, such as non-statistical rule-based analyzer 230. Analyzer 230 can be, for example, a grammar-based robust parser. Grammar-based robust parsers are expressive and portable, can model the language in various granularity, and are relatively easy to modify in order to adapt to new language usages. While they can require manual grammar development or more supervision in automatic training for grammar acquisition and while they may be less robust in terms of unseen data, they can be useful to selector 221 in selecting the accurate task or class ID 214.

Therefore, rule-based analyzer 230 takes, as an input, natural language text 210 and provides, as its output, a class ID (and optionally, a confidence measure) corresponding to the target class. Such a classifier can be a simple trigger-class mapping heuristic (where trigger words or morphs in the input 210 are mapped to a class), or a parser with a semantic understanding grammar.

Class Identification and Semantic Interpretation

Task classification may, in some instances, be insufficient to completely perform a task in applications that need more detailed information. A statistical classifier, or combination of multiple classifiers as discussed above, can only identify the top-level semantic information (such as the class or task) of a sentence. For example, such a system may identify the task corresponding to the natural language input sentence "List flights from Boston to Seattle" as the task "Show-Flights". However, the system cannot identify the detailed semantic information (i.e., the slots) about the task from the users utterance, such as the departure city (Boston) and the destination city (Seattle).

The example below shows the semantic representation for this sentence:

```
<ShowFlight text="list flights from Boston to
Seattle">
    <Flight>
        <City text="Boston" name="Depart"/>
        <City text="Seattle" name="Arrive"/>
    </Flight>
</ShowFlight>
```

In this example, the name of the top-level frame (i.e., the class or task) is "ShowFlight". The paths from the root to the leaf, such as <ShowFlight> <Flight> <City text="Boston" name="Depart"/>, are slots in the semantic representation. The statistical classifiers discussed above are simply unable to fill the slots identified in the task or class.

Such high resolution understanding has conventionally been attempted with a semantic parser that uses a semantic grammar in an attempt to match the input sentences against grammar that models both tasks and slots. However, in such a conventional system, the semantic parser is simply not robust enough, because there are often unexpected instances of commands that are not covered by the grammar.

Figure 6:
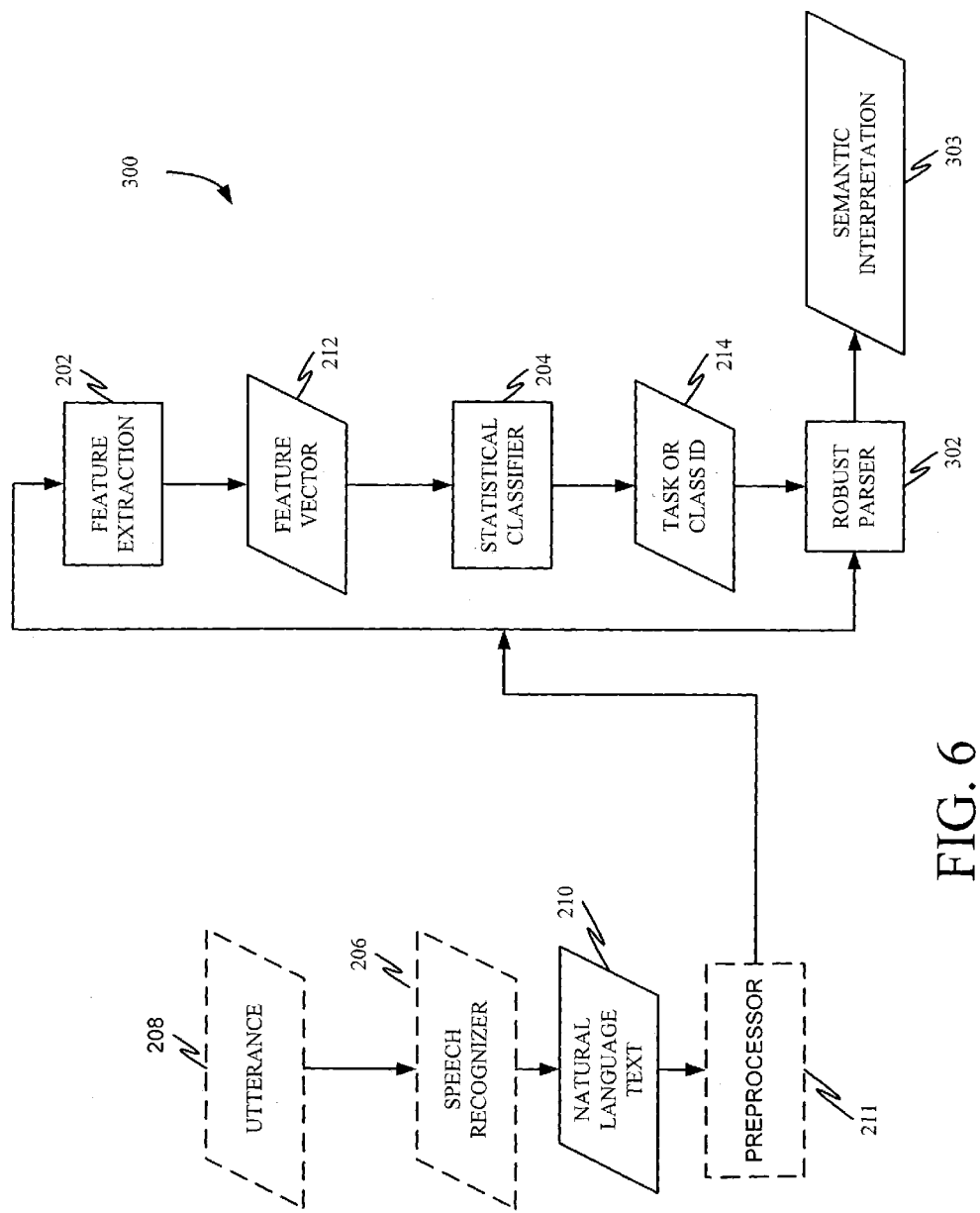
FIG. 6 is a block diagram of a portion of a natural language interface in which task classification and more detailed semantic understanding are obtained in accordance with one embodiment of the present invention.

Therefore, FIG. 6 illustrates a block diagram of a portion of a natural language interface system 300 which takes advantage of both the robustness of statistical classifiers and the high resolution capability of semantic parsers. System 300 includes a number of things which are similar to those shown in previous figures, and are similarly numbered. However, system 300 also includes robust parser 302 which outputs a semantic interpretation 303. Robust parser 302 can be any of those mentioned in Ward, W. *Recent Improvements in the CMU Spoken Language Understanding System*, Human Language Technology Workshop 1994, Plansborough, N.J.; Wang, *Robust Spoken Language Understanding in MiPad*, Eurospeech 2001, Aalborg, Denmark; Wang, *Robust Parser for Spoken Language Understanding*, Eurospeech 1999, Budapest, Hungry; Wang, Acero *Evaluation of Spoken Language Grammar Learning in ATIS Domain*, ICASSP 2002, Orlando, Fla.; Or Wang, Acero, *Grammar Learning for Spoken Language Understanding*, IEEE Workshop on Automatic Speech Recognition and Understanding, 2001, Madonna Di Capiglio, Italy.

Figure 7:
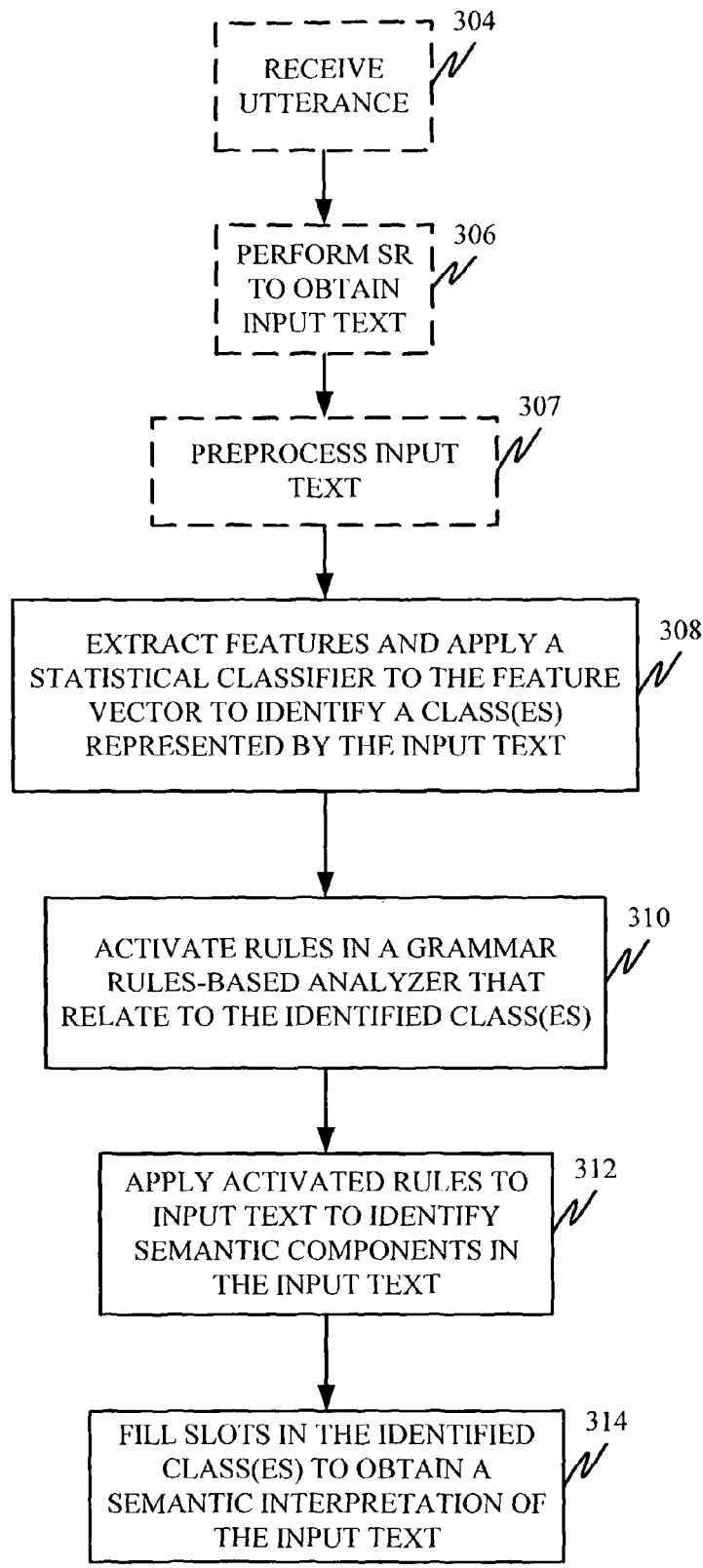
FIG. 7 is a flow diagram illustrating the operation of the system shown in FIG. 6.

FIG. 7 is a flow diagram that illustrates the operation of system 300 shown in FIG. 6. The operation of blocks 208-214 shown in FIG. 6 operate in the same fashion as described above with respect to FIGS. 2-5. In other words, where the input received is a speech or voice input, the utterance is received as indicated by block 304 in FIG. 7 and speech recognition engine 206 performs speech recognition on the input utterance, as indicated by block 306. Then, input text 210 can optionally be preprocessed by preprocessor 211 as indicated by block 307 in FIG. 7 and is provided to feature extraction component 202 which extracts feature vector 212 from input text 210. Feature vector 212 is provided to statistical classifier 204 which identifies the task or class represented by the input text. This is indicated by block 308 in FIG. 7.

The task or class ID 214 is then provided, along with the natural language input text 210, to robust parser 302. Robust parser 302 dynamically modifies the grammar such that the parsing component in robust parser 302 only applies grammatical rules that are related to the identified task or class represented by ID 214. Activation of these rules in the rule-based analyzer 302 is indicated by block 310 in FIG. 7.

Robust parser 302 then applies the activated rules to the natural language input text 210 to identify semantic components in the input text. This is indicated by block 312 in FIG. 7.

Based upon the semantic components identified, parser 302 fills slots in the identified class to obtain a semantic interpretation 302 of the natural language input text 210. This is indicated by block 314 in FIG. 7.

Thus, system 300 not only increases the accuracy of the semantic parser because task ID 214 allows parser 302 to work more accurately on sentences with structure that was not seen in the training data, but it also speeds up parser 302 because the search is directed to a subspace of the grammar since only those rules pertaining to task or class ID 214 are activated.

It can thus be seen that different aspects of the present invention can be used to obtain improvements in both phases of processing natural language in natural language interfaces: identifying a task represented by the natural language input (text classification) and filling semantic slots in the identified task. The task can be identified using a statistical classifier, multiple statistical classifiers, or a combination of statistical classifiers and rule-based classifiers. The semantic slots can be filled by a robust parser by first identifying the class or task represented by the input and then activating only rules in the grammar used by the parser that relate to that particular class or task.

Although the present invention has been described with reference to particular embodiments, workers skilled in the art will recognize that changes may be made in form and detail without departing from the spirit and scope of the invention.

What is claimed is:

1. A computer-readable storage medium including instructions readable by a computer which, when implemented, provide a text classifier in a natural language interface that receives a natural language user input, the text classifier comprising:

a feature extractor extracting a binary feature vector of features from a textual input indicative of the natural language user input;

a statistical classifier coupled to the feature extractor, receiving the feature vector of features, and outputting a selected class identifier, the selected class identifier identifying a task to be completed, associated with the textual input, based on the features in the feature vector, the statistical classifier comprising:

a plurality of statistical classification components each statistical classification component receiving the feature vector and outputting a respective class identifier based on the feature vector, each respective class identifier representing one of a plurality of tasks to be completed that can be identified using each statistical classification component; and a class selector coupled to the plurality of statistical classification components and selecting one of the respective class identifiers as the selected class identifier identifying the task to be completed wherein the class selector comprises one of a group comprising:

a voting component that selects a class identifier that is output by more statistical classification components than other class identifiers; and an additional statistical classifier that receives as an input the class identifiers output from the plurality of statistical classification components and that selects one of the class identifiers received in the input; and a parser that receives the selected class identifier and the textual input and generates a semantic representation of the textual input based on the selected class identifier.

2. The text classifier of claim 1 wherein the parser further comprises:
a rule-based parser receiving the textual input and the selected class identifier and outputting the semantic representation of the textual input.

3. The text classifier of claim 2 wherein the semantic representation includes a class having slots, the rule-based parser filling the slots with semantic expressions.

4. The text classifier of claim 1 and further comprising:
a pre-processor identifying words in the textual input having semantic content.

5. The text classifier of claim 4 wherein the preprocessor is configured to remove words from the textual input that have insufficient semantic content.

6. The text classifier of claim 4 wherein the preprocessor is configured to insert tags for words in the textual input, the tags being semantic labels for the words.

7. The text classifier of claim 1 wherein the feature vector is based only on words in a vocabulary supported by the natural language interface.

8. The text classifier of claim 7 wherein the feature vector is based on n-grams of the words in the vocabulary.

9. The text classifier of claim 7 wherein the feature vector is based only on words in the vocabulary having semantic content.

10. The text classifier of claim 1 wherein the statistical classifier comprises a Naive Bayes Classifier.

11. The text classifier of claim 1 wherein the statistical classifier comprises a support vector machine.

12. The text classifier of claim 1 wherein the statistical classifier comprises a plurality of class-specific statistical language models.

13. The text classifier of claim 1 wherein a number c of classes are supported by the natural language interface and wherein the statistical classifier comprises c class-specific statistical language models.

14. The text classifier of claim 1 and further comprising:
a speech recognizer receiving a speech signal indicative of the natural language input and providing the textual input.

15. The text classifier of claim 1 wherein the statistical classifier identifies a plurality of n-best target classes.

16. The text classifier of claim 15 and further comprising:
an output displaying the n-best target classes for user selection.

17. The text classifier of claim 16 wherein each statistical classifier outputs a plurality of n-best target classes.

18. A computer-implemented method of processing a natural language input for use in completing a task represented by the natural language input, comprising:
generating a feature vector based on the natural language input;
performing statistical classification on the feature vector with a processor to obtain a class identifier identifying a target class associated with the natural language input, the statistical classification being performed by performing statistical classification on the natural language input using a plurality of different statistical classifiers, and selecting the class identifier output by a greatest number of the plurality of statistical classifiers as representing the target class;
selectively activating grammar rules in a grammar used in a rule-based analyzer, the activated grammar rules corresponding to the class identifier; and
analyzing the natural language input with the rule-based analyzer using the grammar with the activated grammar rules to generate semantic expressions from the natural language input to fill semantic slots in the target class.

19. The method of claim 18 and further comprising:
prior to performing statistical classification, identifying words in the natural language input that have semantic content.

20. The method of claim 18 wherein the natural language input is represented by a speech signal and further comprising:
performing speech recognition on the speech signal prior to performing statistical classification.

21. The method of claim 18 wherein selecting comprises:
performing statistical classification on the class identifiers output by the plurality of statistical classifiers to select the class identifier that represents the target class.

22. A computer-implemented method of processing a natural language input for use in completing a task represented by the natural language input, comprising:
generating a feature vector based on the natural language input;
performing statistical classification on the feature vector with a processor to obtain a class identifier identifying a target class associated with the natural language input;
selectively activating grammar rules in a grammar used in a rule-based analyzer, the activated grammar rules corresponding to the class identifier;
analyzing the natural language input with the rule-based analyzer using the grammar with the activated grammar rules to generate semantic expressions from the natural language input to fill semantic slots in the target class;
performing rule-based analysis on the natural language input to obtain another class identifier; and
identifying the target class based on the class identifier obtained from the statistical classification and the another class identifier obtained from the rule-based analysis.

* * * * *